SAMUEL DARLING'S PENCIL SHARPENER
No. 116276 — Patented Jun 27 1871
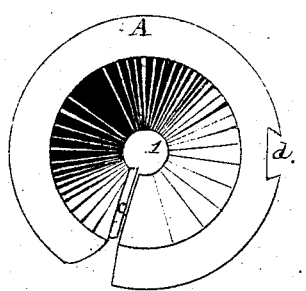
Fig. 1.
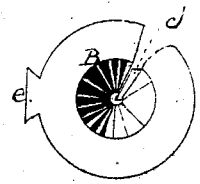
Fig. 2.
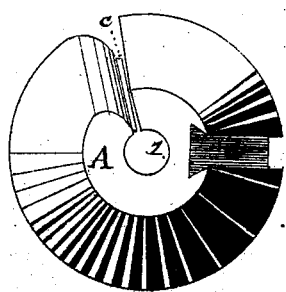
Fig. 3.
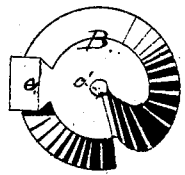
Fig. 4.
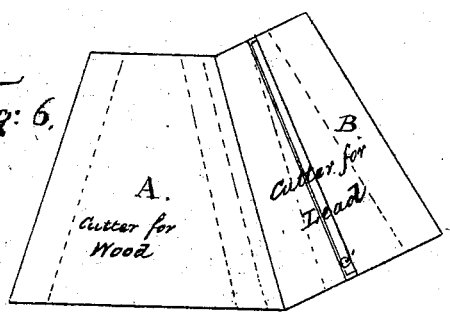
Fig. 6. — A. Cutter for Wood. B. Cutter for Lead.
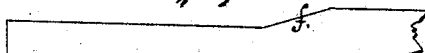
Fig. 7.
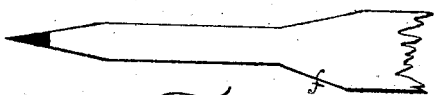
Fig. 8.
Fig. 9.
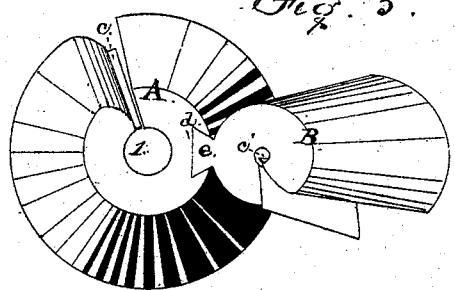
Fig. 5.
Witnesses
Wm Bradford
Inventor
Samuel Darling
by John J. Halsted,
his Atty.

116,276

UNITED STATES PATENT OFFICE.

SAMUEL DARLING, OF PROVIDENCE, RHODE ISLAND.

IMPROVEMENT IN PENCIL-SHARPENERS.

Specification forming part of Letters Patent No. 116,276, dated June 27, 1871.

*To all whom it may concern:*

Be it known that I, SAMUEL DARLING, of the city and county of Providence, in the State of Rhode Island, have invented certain Improvements in Pencil-Sharpeners; and I do hereby declare that the following, taken in connection with the drawing which accompanies and forms part of this specification, is a description of my invention sufficient to enable those skilled in the art to practice it.

I construct my sharpening implement so that one cutter shall act only upon the wood, reducing it down near to the lead, but not near enough for the blade to come in contact with it; and I employ another stock, having also a cutter, and which stock I removably attach to the stock of the other or wood-cutter, and I so construct it that its blade shall give the taper to the tip of the pencil, which is left entirely blunt or cylindrical by the first cutter. In this way the main cutter keeps sharp for a very long time, as it never cuts anything but soft wood, and has no contact with any loose grit or fragments of lead which could destroy its efficiency; and whenever the tip or lead-cutter becomes dull by the action of the grit and metal upon its blade, I remove it and its stock from the other stock and replace it with another similar one, a supply being provided in advance for this purpose.

Figure 1 is an end view of the larger end of the main cutter and its stock. Fig. 2 is a similar view of the auxiliary cutter and its stock. Figs. 3 and 4 show the same parts as Figs. 1 and 2, but with the ends reversed. Fig. 5 shows an end view of the main and auxiliary implements when united together into one implement. Fig. 6 is a top or plan view of the same. Figs. 7, 8, and 9 represent pencils reduced and sharpened by my improved device. All the figures are drawn to an enlarged scale.

A is the main cutting implement or wood-reducer, and B the auxiliary cutter or tip-sharpener, each having a steel blade, $c$ or $c'$, inserted in the usual manner, and secured therein in the act of casting or "founding" the stock, which is made of soft metal. The tapering opening in the part A has its smaller end, 1, of a diameter much larger than in sharpeners as heretofore made, and considerably greater than that of the lead of an ordinary pencil. In this way the cutting-edge alawys escapes contact with the lead. The tapering opening in the auxiliary sharpener is, at its larger end, about the diameter of the smaller end of the main one, and I prefer to have it taper more gradually, so as to give a fine delicate point to the lead. One of the two implements I construct with an exterior longitudinal dovetail groove, $d$, and the other with a corresponding dovetailed rib, $e$, so that one may be slidden upon and held firmly to the other when in use as if they were one piece, the groove and rib having a slight taper that they may be tight and not be slidden too far.

It will now be seen that whenever the smaller or lead-cutter becomes too dull for use its stock needs only to be slidden off and another one substituted, the blade of the main stock remaining sharp. A supply of the tip-sharpeners would in practice be put up and sold to accompany one main sharpener.

The pencil shown in Fig. 7 shows how the main cutter can reduce the wood to a small diameter, and in cylindrical form of that diameter, as far up from the end of the pencil as may be desired. Fig. 8 shows a pencil so reduced, and which has been afterward operated upon by the other or lead-cutter to give the point to the marking part. Fig. 9 shows a pencil which has also been acted upon by both of my cutters, the difference in the appearance, as compared with Figs. 7 and 8, being due simply to the fact that the first cutter was not permitted to cut away the wood except a short distance from its end.

By my mode of sharpening, after the first cutter has been used the wood may, if desired, be removed from the lead as far as it is necessary to point it by the use of a knife, so that the pointer would not have to cut any wood at all.

The wood-cutter may be used to great advantage where a knife is used to tip the point, as it serves as a guide to the knife. And when, by means of it, the wood is cut, as seen in Figs. 7 and 8, the part $f$, being made at a proper distance from the end, forms a rest for the middle finger of the person using the pencil.

I claim—

As a new article of manufacture, a pencil-sharpener, composed of two separate stocks, removable from each other, substantially as described, the one being furnished with a cutter which acts upon the wood only, and the other with a cutter which acts upon the lead and the remaining part of the wood together.

SAMUEL DARLING.

Witnesses:
EDWARD C. ASHLEY,
NATHAN GOFFP.